(12) United States Patent
Gupta et al.

(10) Patent No.: US 9,538,547 B2
(45) Date of Patent: Jan. 3, 2017

(54) USER EQUIPMENT INITIATED DISCONTINUOUS OPERATION IN A WIRELESS COMMUNICATIONS NETWORK

(71) Applicant: Intel Corporation, Santa Clara, CA (US)

(72) Inventors: Maruti Gupta, Portland, OR (US); Rath Vannithamby, Portland, OR (US); Puneet Jain, Hillsboro, OR (US); Ali Taha Koc, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/062,572

(22) Filed: Mar. 7, 2016

(65) Prior Publication Data
US 2016/0192435 A1 Jun. 30, 2016

Related U.S. Application Data

(63) Continuation of application No. 14/127,805, filed as application No. PCT/US2012/044670 on Jun. 28, 2012.
(Continued)

(51) Int. Cl.
*H04W 52/02* (2009.01)
*H04W 72/02* (2009.01)
(Continued)

(52) U.S. Cl.
CPC ....... *H04W 72/1215* (2013.01); *H04B 7/0697* (2013.01); *H04B 15/00* (2013.01);
(Continued)

(58) Field of Classification Search
CPC .... H04B 15/00; H04B 7/0697; H04W 76/048; H04W 8/02; H04W 52/244; H04W 24/00; H04W 72/042; H04W 4/005; H04W 52/0251; H04W 72/02; H04W 76/028; H04L 27/362; H04L 1/0025; H04L 1/0041; H04L 1/0045; H04L 1/06; H04L 27/34; H04L 5/14; H04L 5/0037
(Continued)

(56) References Cited

U.S. PATENT DOCUMENTS 8,937,876 B2   1/2015   Anderson et al.
8,953,509 B2   2/2015   Lee et al.
(Continued)

FOREIGN PATENT DOCUMENTS

AU    2013212110 B2    3/2016
CN    103999515 A      8/2014
(Continued)

OTHER PUBLICATIONS

"Analysis on sending the MTC Indicator to the network in Release 10", Nokia Siemens Networks, Nokia, 3GPP TSG SA WG2 Meeting #82 TD S2-105744, TD C1-104835, (Nov. 9, 2010), 6 pgs.
(Continued)

*Primary Examiner* — Raj Jain
*Assistant Examiner* — Albert Shih
(74) *Attorney, Agent, or Firm* — Schwegman Lundberg & Woessner, P.A.

(57) ABSTRACT

An apparatus and method for initiating discontinuous reception (DRX) operation in a user equipment (UE) are disclosed herein. Applications running on the UE are monitored by the UE to identify one or more inactivity trigger events associated with the application(s). The UE includes an application-radio cross layer to process the application information, including the inactivity trigger event, for use by a radio layer. The radio layer of the UE determines initiation of the DRX operation in accordance with the application informa-
(Continued)

tion, including the inactivity trigger event, provided by the application-radio cross layer and device characteristics information.

24 Claims, 4 Drawing Sheets

Related U.S. Application Data

(60) Provisional application No. 61/504,054, filed on Jul. 1, 2011.

(51) Int. Cl.
| | |
|---|---|
| H04W 76/02 | (2009.01) |
| H04W 4/00 | (2009.01) |
| H04L 5/14 | (2006.01) |
| H04W 72/12 | (2009.01) |
| H04W 72/08 | (2009.01) |
| H04W 88/06 | (2009.01) |
| H04B 7/06 | (2006.01) |
| H04L 1/06 | (2006.01) |
| H04W 72/04 | (2009.01) |
| H04B 15/00 | (2006.01) |
| H04W 8/02 | (2009.01) |
| H04W 24/00 | (2009.01) |
| H04W 52/24 | (2009.01) |
| H04L 5/00 | (2006.01) |
| H04L 27/34 | (2006.01) |
| H04W 52/14 | (2009.01) |
| H04W 24/08 | (2009.01) |
| H04W 76/04 | (2009.01) |
| H04L 27/36 | (2006.01) |
| H04L 1/00 | (2006.01) |
| H04W 52/32 | (2009.01) |
| H04W 84/04 | (2009.01) |

(52) U.S. Cl.
CPC .......... *H04L 1/0038* (2013.01); *H04L 1/0041* (2013.01); *H04L 1/0045* (2013.01); *H04L 1/06* (2013.01); *H04L 5/0037* (2013.01); *H04L 5/14* (2013.01); *H04L 27/34* (2013.01); *H04W 4/005* (2013.01); *H04W 8/02* (2013.01); *H04W 24/00* (2013.01); *H04W 24/08* (2013.01); *H04W 52/0209* (2013.01); *H04W 52/0212* (2013.01); *H04W 52/0251* (2013.01); *H04W 52/0258* (2013.01); *H04W 52/143* (2013.01); *H04W 52/242* (2013.01); *H04W 52/244* (2013.01); *H04W 72/02* (2013.01); *H04W 72/04* (2013.01); *H04W 72/042* (2013.01); *H04W 72/082* (2013.01); *H04W 72/1278* (2013.01); *H04W 76/028* (2013.01); *H04W 76/048* (2013.01); *H04W 88/06* (2013.01); *H04L 1/0025* (2013.01); *H04L 27/362* (2013.01); *H04W 52/325* (2013.01); *H04W 84/042* (2013.01); *Y02B 60/50* (2013.01)

(58) Field of Classification Search
USPC .......................................... 370/280, 311, 281
See application file for complete search history.

(56) References Cited

U.S. PATENT DOCUMENTS

| | | | |
|---|---|---|---|
| 8,989,042 | B2 | 3/2015 | Chou et al. |
| 9,225,759 | B2 | 12/2015 | Vannithamby et al. |
| 9,247,501 | B2 | 1/2016 | Kazmi |
| 2007/0287468 | A1 | 12/2007 | Jeong et al. |
| 2007/0291673 | A1 | 12/2007 | Demirhan et al. |
| 2008/0181127 | A1 | 7/2008 | Terry et al. |
| 2008/0232310 | A1 | 9/2008 | Xu |
| 2009/0232054 | A1 | 9/2009 | Wang et al. |
| 2009/0238098 | A1* | 9/2009 | Cai ..................... H04W 76/048 370/254 |
| 2010/0118752 | A1 | 5/2010 | Suzuki et al. |
| 2010/0255835 | A1 | 10/2010 | Suzuki et al. |
| 2010/0309798 | A1 | 12/2010 | Fodor et al. |
| 2011/0136530 | A1 | 6/2011 | Deshpande |
| 2011/0199951 | A1 | 8/2011 | Kwon et al. |
| 2011/0243047 | A1 | 10/2011 | Dayal et al. |
| 2012/0033597 | A1 | 2/2012 | Kim et al. |
| 2012/0106424 | A1 | 5/2012 | Davies et al. |
| 2012/0115552 | A1 | 5/2012 | Bhattacharya |
| 2012/0120828 | A1 | 5/2012 | Anderson et al. |
| 2012/0120843 | A1 | 5/2012 | Anderson et al. |
| 2012/0164954 | A1 | 6/2012 | Karampatsis et al. |
| 2012/0207040 | A1 | 8/2012 | Comsa et al. |
| 2012/0236834 | A1 | 9/2012 | Ho et al. |
| 2012/0320811 | A1 | 12/2012 | Islam et al. |
| 2013/0083713 | A1 | 4/2013 | Johansson et al. |
| 2013/0107727 | A1 | 5/2013 | Lunden et al. |
| 2013/0114583 | A1 | 5/2013 | Park et al. |
| 2013/0155928 | A1 | 6/2013 | Yu et al. |
| 2013/0194991 | A1 | 8/2013 | Vannithamby et al. |
| 2014/0112221 | A1 | 4/2014 | Verger et al. |
| 2014/0119255 | A1 | 5/2014 | Vannithamby et al. |
| 2014/0226542 | A1 | 8/2014 | Gupta et al. |
| 2014/0293973 | A1 | 10/2014 | Lin et al. |
| 2015/0071179 | A1 | 3/2015 | Zhang et al. |
| 2015/0271868 | A1* | 9/2015 | Rune ..................... H04W 4/005 370/311 |
| 2016/0113059 | A1 | 4/2016 | Vannithamby et al. |

FOREIGN PATENT DOCUMENTS

| | | |
|---|---|---|
| CN | 105636239 A | 6/2016 |
| JP | 2006270296 A | 10/2006 |
| JP | 2010508704 A | 3/2010 |
| JP | 2010526495 A | 7/2010 |
| JP | 2010538506 A | 12/2010 |
| JP | 5833258 B2 | 11/2015 |
| RU | 2558662 C1 | 8/2015 |
| RU | 2594001 C2 | 8/2016 |
| WO | WO-2007082934 A1 | 7/2007 |
| WO | WO-2010054391 A2 | 5/2010 |
| WO | WO-2013006381 A3 | 5/2013 |
| WO | WO-2013112733 A1 | 8/2013 |

OTHER PUBLICATIONS

"U.S. Appl. No. 13/626,409, Advisory Action mailed Jan. 23, 2015", 4 pgs.
"U.S. Appl. No. 13/626,409, Examiner Interview Summary mailed Jul. 9, 2015", 3 pgs.
"U.S. Appl. No. 13/626,409, Final Office Action mailed Aug. 29, 2014", 25 pgs.
"U.S. Appl. No. 13/626,409, Non Final Office Action mailed Mar. 18, 2015", 22 pgs.
"U.S. Appl. No. 13/626,409, Non Final Office Action mailed Mar. 24, 2014", 20 pgs.
"U.S. Appl. No. 13/626,409, Notice of Allowance mailed Aug. 19, 2015", 9 pgs.
"U.S. Appl. No. 13/626,409, Response filed Jan. 7, 2015 to Final Office Action mailed Aug. 29, 2014", 12 pgs.
"U.S. Appl. No. 13/626,409, Response filed Jun. 24, 2014 to Non Final Office Action mailed Mar. 24, 2014", 12 pgs.
"U.S. Appl. No. 13/626,409, Response filed Jul. 2, 2015 to Non Final Office Action mailed Mar. 18, 2015", 11 pgs.
"U.S. Appl. No. 14/979,827, Preliminary Amendment filed Dec. 30, 2015", 5 pgs.
"Australian Application Serial No. 2013212110, First Examiner's Report mailed Feb. 10, 2015", 6 pgs.

(56) References Cited

OTHER PUBLICATIONS

"Australian Application Serial No. 2013212110, Response filed Jul. 16, 2015 to First Examiner's Report mailed Feb. 10, 2015", 25 pgs.
"Australian Application Serial No. 2013212110, Response filed Sep. 23, 2015 to Subsequent Examiner's Report mailed Sep. 2, 2015", 12 pgs.
"Australian Application Serial No. 2013212110, Subsequent Examiners Report mailed Sep. 2, 2015", 3 pgs.
"Canadian Application Serial No. 2,862,374, Office Action mailed Dec. 9, 2015", 8 pgs.
"European Application Serial No. 12807773.2, Extended European Search Report mailed Feb. 17, 2015", 6 pgs.
"European Application Serial No. 12807773.2, Response filed to Sep. 16, 2015 Extended European Search Report mailed Feb. 17, 2015", 15 pgs.
"European Application Serial No. 13740758.1, Extended European Search Report mailed Sep. 24, 2015", 7 pgs.
"International Application Serial No. PCT/US2012/044670, International Preliminary Report on Patentability mailed Jan. 16, 2014", 6 pgs.
"International Application Serial No. PCT/US2012/044670, International Search Report mailed Jan. 29, 2013", 3 pgs.
"International Application Serial No. PCT/US2012/044670, Written Opinion mailed Jan. 29, 2013", 4 pgs.
"International Application Serial No. PCT/US2013/022985, International Preliminary Report on Patentability mailed Aug. 7, 2014", 7 pgs.
"International Application Serial No. PCT/US2013/022985, International Search Report mailed Apr. 1, 2013", 3 pgs.
"International Application Serial No. PCT/US2013/022985, Written Opinion mailed Apr. 1, 2013", 5 pgs.
"Japanese Application Serial No. 2014-519030, Office Action mailed Jan. 27, 2015", w/ English Translation, 9 pgs.
"Japanese Application Serial No. 2014-519030, Response filed Apr. 24, 2015 to Office Action mailed Jan. 27, 2015", W/ English Claims, 13 pgs.
"Japanese Application Serial No. 2014-553550, Office Action mailed Jun. 30, 2015", W/ English Translation, 6 pgs.
"Japanese Application Serial No. 2014-553550, Response filed Sep. 3, 2015 to Office Action mailed Jun. 30, 2015", 10 pgs.
"Korean Application Serial No. 2014-7002377, Non Final Office Action Apr. 2, 2015", W/ English Translation, 17 pgs.
"Korean Application Serial No. 2014-7002377,Response filed Jun. 2, 2015 Non Final Office Action Apr. 2, 2015", W/ English Claims, 22 pgs.
"Korean Application Serial No. 10-2014-7020673, Notice of Last Preliminary Rejection mailed Jan. 26, 2016", 7 pgs.
"Korean Application Serial No. 10-2014-7020673, Office Action mailed Jun. 17, 2015", W/ English Translation, 10 pgs.
"Korean Application Serial No. 10-2014-7020673, Response filed Aug. 17, 2015 to Office Action mailed Jun. 17, 2015", 26 pgs.
"Mexican Application Serial No. MX/a/2014/009088, Office Action mailed Jan. 22, 2016", 2 pgs.
"Russian Application Serial No. 2014134847, Office Action mailed Nov. 12, 2015", 4 pgs.
"Russian Application Serial No. 2014134847, Response filed Jan. 12, 2016 to Office Action mailed Nov. 12, 2015", 11 pgs.
Bontu, C. et al., "DRX mechanism for power saving in LTE", IEEE Communications Magazine, IEEE Service Center, Piscataway, US, vol. 47, No. 6, (Jun. 1, 2009), 48-55.
Intel Corporation, "LTE Fast Dormancy", 3GGP TSG-RAN WG2 Meeting #72 R2-106825, [Online] retrieved from the internet: <http://www.3gpp.org/ftp/tsg_ran/WG2_RL2/TSGR2_72/Docs/R2-106285.zip>, (Nov. 10, 2010).
Nokia, "DRX parameter negotiation in PDP Context activation/modification/deactivation", 3GPP TSG-SA WG2#30 S2-030543, [Online] retrieved from the internet: <http://www.3gpp.org/ftp/tsg_sa/WG2_Arch/TSGS2_30_Milan/tdocs/S2-030543.zip>, (Mar. 2, 2003).
"U.S. Appl. No. 14/127,805, Final Office Action mailed Nov. 3, 2016", 25 pgs.
"U.S. Appl. No. 14/979,827, Final Office Action mailed Oct. 14, 2016", 15 pgs.
"U.S. Appl. No. 14/127,805, Non Final Office Action mailed Apr. 22, 2016", 22 pgs.
"U.S. Appl. No. 14/127,805, Response filed Jul. 18, 2016 to Non Final Office Action mailed Apr. 22, 2016", 10 pgs.
"U.S. Appl. No. 14/979,827, Examiner Interview Summary mailed Jul. 7, 2016", 5 pgs.
"U.S. Appl. No. 14/979,827, Non Final Office Action mailed Apr. 8, 2016", 11 pgs.
"U.S. Appl. No. 14/979,827, Response filed Jul. 18, 2016 to Non Final Office Action mailed Apr. 8, 2016", 8 pgs.
"Brazilian Application Serial No. 1120140184992, Voluntary Amendment filed Jan. 7, 2016", W/ English Claims, 15 pgs.
"Canadian Application Serial No. 2,862,374, Response filed Jun. 6, 2016 to Office Action mailed Dec. 9, 2015", 17 pgs.
"European Application Serial 16160959.9, Extended European Search Report mailed May 10, 2016", 7 pgs.
"European Application Serial No. 13740758.1, Response filed Apr. 25, 2016 to Extended European Search Report mailed Sep. 24, 2015", 14 pgs.
"Korean Application Serial No. 10-2014-7020673, Response filed Mar. 28, 2016 to Notice of Last Preliminary Rejection mailed Jan. 26, 2016", w/ English Claims, 18 pgs.
"Korean Application Serial No, 2014-7002377, Final Office Action mailed 10-28-15", w/ English Translation, 10 pgs.
"Korean Application Serial No. 2014-7002377, Response filed Dec. 24, 2015 to Final Office Action mailed Oct. 28, 2015", W/ Machine Translation, 33 pgs.
"Mexican Application Serial No. MX/a/2014/009088, Response filed Jun. 3, 2016 to Office Action mailed Jan. 22, 2016", W/ English Claims, 12 pgs.

* cited by examiner

USER EQUIPMENT INITIATED DISCONTINUOUS OPERATION IN A WIRELESS COMMUNICATIONS NETWORK

CROSS-REFERENCE TO RELATED APPLICATIONS

This application is a continuation of U.S. patent application Ser. No. 14/127,805, filed Apr. 21, 2014, which is a U.S. National Stage Filing under 35 U.S.C. 371 from International Application Number PCT/US2012/044670, filed on Jun. 28, 2012, and published as WO 2013/006381 A2 on Jan. 10, 2013, which application claims priority to U.S. Provisional Patent Application No. 61/504,054, entitled "Method and Apparatus for LTE" filed on Jul. 1, 2011, each of which is incorporated herein by reference in its entirety.

TECHNICAL FIELD

The present disclosure relates generally to wireless communications. More particularly, the present disclosure relates to user equipment initiated operations within wireless communication systems.

BACKGROUND

Devices operating within a wireless data communications network expend significant power to receive instructions and data and perform associated signal processing. As wireless data communications networks increase data rates, the power consumption of devices is also increasing. For mobile devices, which are typically powered by a limited power source in the form of batteries, a design goal is to achieve battery power conservation without adversely affecting active operation requirements.

One way for devices to conserve power (and reduce signaling overhead) in current 3rd Generation Partnership Project (3GPP) long term evolution (LTE)-Advanced systems is to implement discontinuous reception (DRX) operation. DRX operation involves reducing the transceiver duty cycle of the device. An enhanced node B (eNodeB) within a 3GPP-LTE system instructs one or more devices within its serving area to initiate DRX operation based on meeting a pre-determined inactivity timer value specified by the eNodeB. The eNodeB also instructs the device(s) as to a particular DRX duty cycle (e.g., when a device should be "on" to receive scheduling and paging information and/or data, and when the device should be "off" to conserve power usage). Only the eNodeB can initiate DRX operation. Current 3GPP LTE-Advanced systems do not support initiation of DRX operation by user equipment (UE) devices.

DETAILED DESCRIPTION

The following description is presented to enable any person skilled in the art to create and use a computer system configuration and related method and article of manufacture to determine and initiate discontinuous reception (DRX) operation by a user equipment (UE) operating in a wireless communications network. The protocol stack of the UE includes new components to identify inactivity trigger events associated with applications running on the UE and/or device characteristics of the UE (non-access stratum (NAS) parameters), facilitate access to the inactivity trigger events by a radio resource control/medium access control (RRC/MAC) layer, and for the RRC/MAC layer to determine whether to initiate DRX operation (and optionally, to select a particular DRX duty cycle or other DRX parameters). The UE signals intent to trigger DRX operation to its associated eNodeB using radio resource control (RRC) signaling included in radio frame(s), and in response to receiving confirmation from the eNodeB, switches to DRX mode. Hence, UE achieves power savings, reduces battery consumption, and/or reduction in signaling overhead over the air interface from smart idle mode implementation. The UE suggests one or more DRX parameters to the eNodeB based on its actual operating state and/or device characteristics.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

Figure 1:
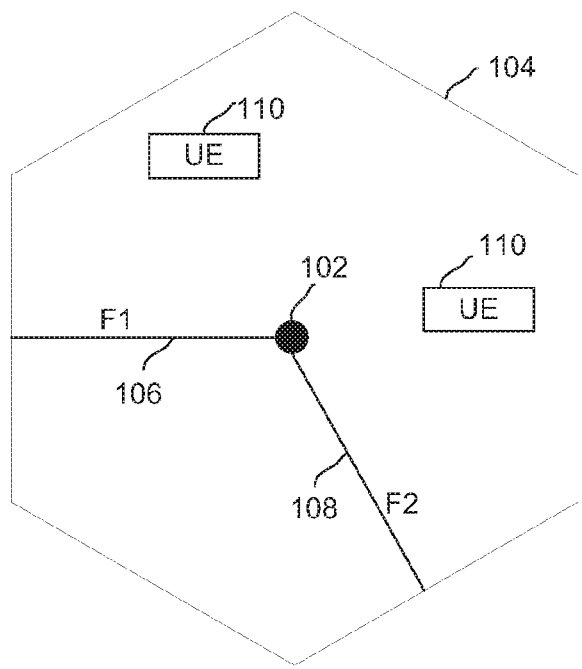
FIG. 1 illustrates an example (portion) of a wireless communications network according to some embodiments.

FIG. 1 illustrates an example (portion) of a wireless communications network 100 according to some embodiments. The wireless communications network 100 includes an enhanced Node B (eNodeB or eNB) 102 and a plurality of user equipments (UEs) 110. In one embodiment, the wireless communications network 100 comprises an evolved universal terrestrial radio access network (EUTRAN) using the 3rd Generation Partnership Project (3GPP) long term evolution (LTE) standard operating in time division duplex (TDD) mode. In another embodiment, the wireless communications network 100 comprises a EUTRAN using the 3GPP-LTE standard operating in frequency division duplex (FDD) mode. In still other embodiments, the wireless communications network 100 can be a Wi-Fi network, a WiMax network, a 3rd generation (3G) network, and other wireless data communications networks.

The eNodeB 102 (also referred to as a base station) serves a certain geographic area, denoted as a cell 104. The UEs 110 located within the cell 104 are served by the eNodeB 102. The eNodeB 102 communicates with the UEs 110 on a first carrier frequency 106 (F1) (e.g., the primary carrier component) and optionally, one or more secondary carrier frequencies, such as a second carrier frequency 108 (F2) (e.g., the secondary carrier component). For ease of illustration, only a single eNodeB is shown in FIG. 1. However, it is understood that the wireless communications network 100 includes more than one eNodeB, each of the eNodeBs serving a particular cell which may or may not neighbor the eNodeB 102.

The UEs 110 may comprise a variety of devices including, but not limited to, cellular telephones, smart phones, tablets, laptops, desktops, personal computers, servers, personal digital assistants (PDAs), web appliances, set-top box (STB), a network router, switch or bridge, and the like. One or more UEs 110 may move into or out of the cell 104 at any given time.

Figure 2:
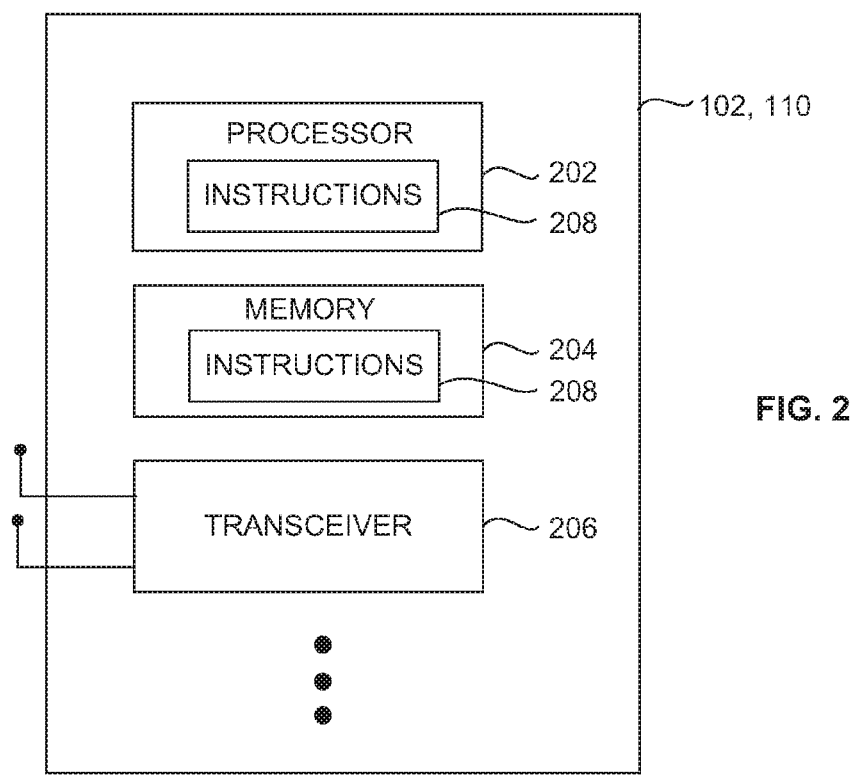
FIG. 2 illustrates an example block diagram showing details of the eNodeB and any of the UEs according to some embodiments.

FIG. 2 illustrates an example block diagram showing details of the eNodeB 102 and any of the UEs 110 according to some embodiments. The eNodeB 102/UE 110 includes a processor 202, a memory 204, a transceiver 206, instructions 208, and other components (not shown). The processor 202 comprises one or more central processing units (CPUs), graphics processing units (GPUs), or both. The processor 202 is configured to provide processing and control functionalities for the eNodeB 102/UE 110. The memory 204 comprises one or more transient and static memory units configured to store instructions, data, setting information, and the like for the eNodeB 102/UE 110. The transceiver 206 comprises one or more transceivers configured to receive uplink receptions and transmit downlink transmissions between the eNodeB 102 and the UEs 110 within range of the eNodeB 102. The transceiver 206 includes one or more multiple-input and multiple-output (MIMO) antenna to support MIMO communications. In some MIMO embodiments, the antennas may be effectively separated to take advantage of spatial diversity and the different channel characteristics that may result between each of antennas and the antennas of a transmitting station. In some MIMO embodiments, the antennas may be separated by up to $\frac{1}{10}$ of a wavelength or more.

The instructions 208 comprises one or more sets of instructions or software executed on a computing device (or machine) to cause such computing device (or machine) to perform any of the methodologies discussed herein. The instructions 208 (also referred to as computer-readable instructions, machine-readable instructions, modules, components, or apps) may reside, completely or at least partially, within the processor 202 and/or memory 204 during execution thereof. The processor 202 and memory 204 also comprise machine-readable media. In one embodiment, the processor 202 is configured to execute the instructions 208 to facilitate operations associated with initiating discontinuous reception (DRX) operation by one or more UEs 110, as described in detail below.

Although the eNodeB 102/UE 110 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 110 may be configured with the instructions to perform the operations described herein.

In some embodiments, the UE 110 may be configured to receive Orthogonal Frequency Division Multiplex (OFDM) communication signals over a multicarrier communication channel in accordance with an OFDMA communication technique. In some embodiments, the OFDMA technique may be either a frequency domain duplexing (FDD) technique that uses different uplink and downlink spectrum or a time domain duplexing (TDD) technique that uses the same spectrum for uplink and downlink. The OFDM signals may comprise a plurality of orthogonal subcarriers. In some broadband multicarrier embodiments, eNodeB 102 may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 110 and the eNodeB 102 may be configured to communicate in accordance with an orthogonal frequency division multiple access (OFDMA) technique. The UTRAN LTE standards include the 3rd Generation Partnership Project (3GPP) standards for UTRAN-LTE, Release 8, March 2008, and Release 10, December 2010, including variations and evolutions thereof.

The UEs 110 located in the cell 104 transmit data to the eNodeB 102 (uplink transmission) and receive data from the eNodeB 102 (downlink transmission) using radio frames comprising Orthogonal Frequency-Division Multiple Access (OFDMA) frames configured for TDD operations or FDD operations. Each of the radio frames comprises a plurality of uplink and downlink subframes, the uplink and downlink subframes configured in accordance with the uplink-downlink ratio configuration selected from among the supported uplink-downlink ratio configurations. (See 3GPP TS 36.211 Version 9.1.0, E-UTRA Physical Channels and Modulation (Release 9), March 2010.)

Figure 3:
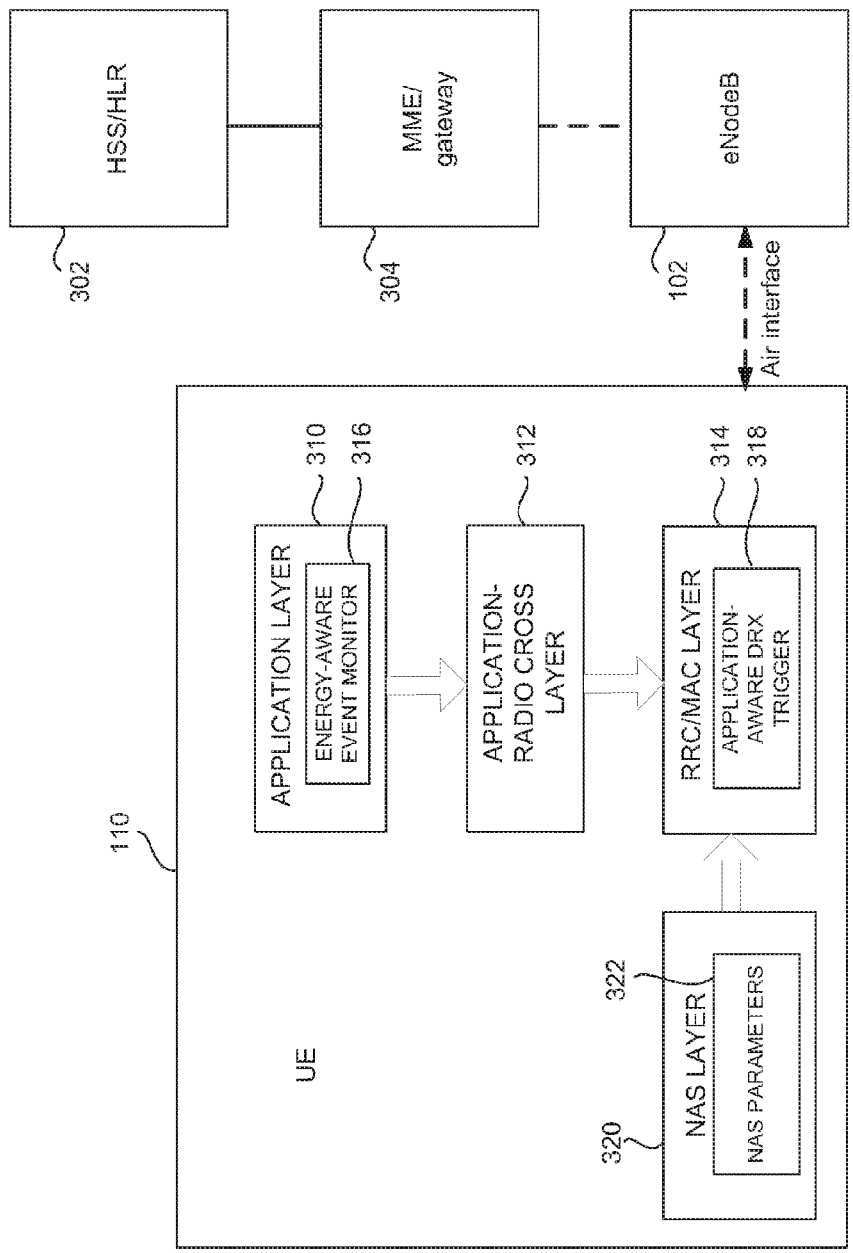
FIG. 3 illustrates at least a portion of a protocol stack associated with an UE according to some embodiments.

FIG. 3 illustrates at least a portion of a protocol stack associated with each UE 110 according to some embodiments. The protocol stack of each of the UEs 110 includes an application layer 310, an application-radio cross layer 312, a radio resource control/medium access control (RRC/MAC) layer 314, and a non-access stratum (NAS) layer 320. Data is communicated from the application layer 310 to the application-radio cross layer 312, and data is communicated from each of the application-radio cross layer 312 and the NAS layer 320 to the RRC/MAC layer 314. The application layer 310 includes an energy-aware event monitor component 316. The RRC/MAC layer 314 includes an application-aware DRX trigger component 318. The NAS layer 320 includes a NAS parameters component 322.

The UE 110 wirelessly communicates with the eNodeB 102 via an air interface. A mobility management entity (MME)/gateway 304 is provided in the communication path between the eNodeB 102 and a home subscriber server (HSS)/home location register (HLR) 302. The eNodeB 102 wirelessly communicates with the MME/gateway 304. The MME/gateway 304 communicates with the HSS/HLR 302. MME/gateway 304 (also referred to as the MME 304) comprises a control node for the wireless communications network 100 that is configured to, among other things, control access to HSS/HLR 302. HSS/HLR 302 comprises a master repository of subscriber information, account information, UE information, service information, and/or other information relating to devices operating within the wireless communications network 100. For example, the stored information can include account numbers, user preferences, user permissions, network permissions, UE characteristics or specifications, and the like. MME/gateway 304 mediates accessing, for example, UE characteristics stored in the HSS/HLR 302 in response to a request from the UE 110 for such information.

Figure 4:
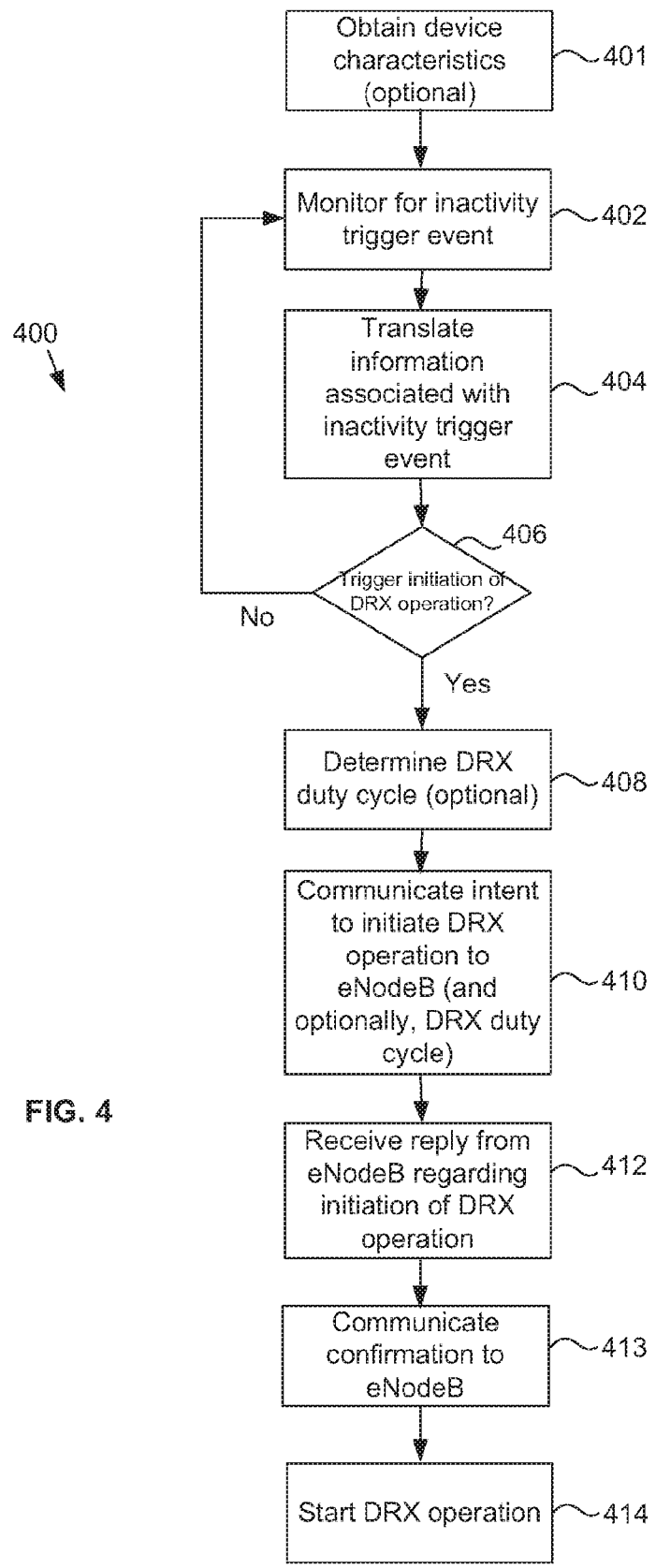
FIG. 4 illustrates an example flow diagram for an UE to initiate DRX operation based on application operation information according to some embodiments.
Figure 5:
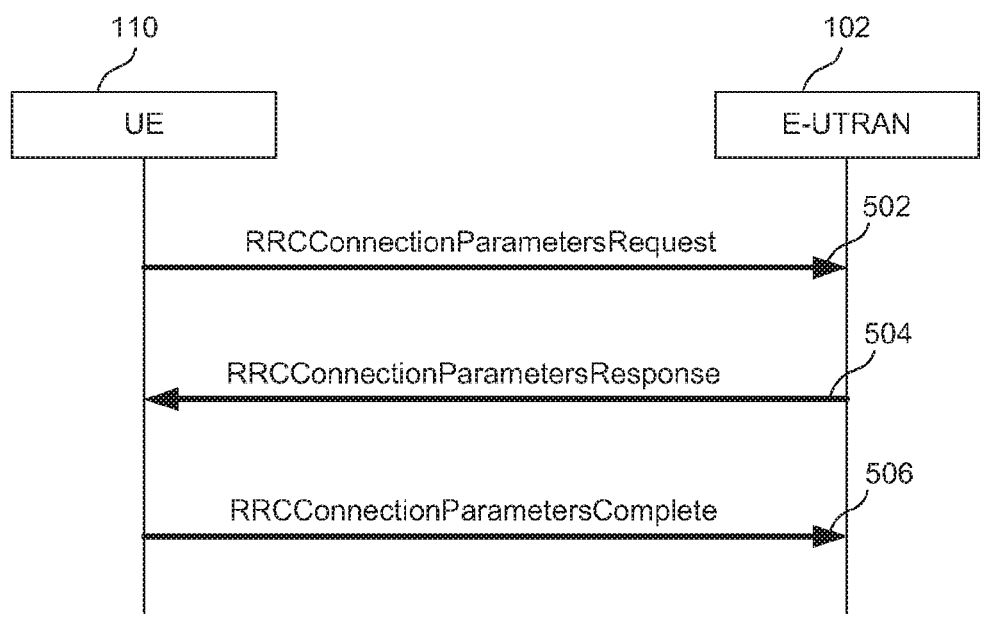
FIG. 5 illustrates an example timing diagram for UE initiation of DRX operation using RRC signaling according to some embodiments.

FIG. 4 illustrates an example flow diagram 400 for a UE 110 to initiate DRX operation based on its application operation information according to some embodiments—as opposed to eNodeB 102 initiating the DRX operation for the given UE 110 using a statically assigned inactivity timer under the current specification. FIG. 5 illustrates an example timing diagram for UE initiation of DRX operation using radio resource control (RRC) signaling according to some embodiments. FIG. 4 is described below in conjunction with FIG. 5.

At a block 401 UE 110 communicates with the eNodeB 102 to obtain information about its device characteristics from the HSS/HLR 302 via the MME/gateway 304 during the network attach procedure (in which the UE 110 establishes a connection session with the network). Device characteristics include, but are not limited to, delay tolerance of data to be sent or received by the UE 110 (such as delay tolerance associated with applications on the UE 110) and/or whether UE 110 is a machine-to-machine (M2M) type of device. The NAS layer 320 of the UE 110 requests the device characteristics information, and the received information is stored in the NAS parameters component 322.

Alternatively, block 401 may be optional if the NAS parameters component 322 already includes the device characteristics information.

At a block 402, the energy-aware event monitor component 316 (also referred to as the enemy-aware event monitor, application event monitor, or application inactivity event monitor) included in the application layer 310 monitors applications running on the UE 110 to identify or predict one or more inactivity trigger events. An inactivity trigger event (also referred to as an inactivity event) comprises a time period when there can be no data packets received or sent for the UE 110 with minimal or no sacrifice of application performance, and thus amenable to power and signaling overhead conservation.

Inactivity trigger event includes, but is not limited to:
An application end-of-session—When a current application session (e.g., an instant messaging (IM) chat, a Skype call, a streamed movie, a web-based meeting, etc.) ends, the UE 110 can decide based on the status of other applications and/or network traffic whether to initiate a DRX operation.
Periodicity of keep-alive messages associated with an application—Some of the most popular applications allow users to maintain an online "presence" and keep people on their contact list current as to their status. Examples of such applications include Facebook, Google chat, Microsoft Communicator, Skype, social networking websites, web-based chats, web-based news feeds, and the like. These applications use periodic short messages (also referred to as keep-alive messages) to keep content up-to-date. The UE 110 can use the known periodicity of the keep-alive messages to determine whether to initiate a DRX operation, to determine a DRX duty cycle, and/or to set a higher inactivity timer for going into RRC_Idle state. For instance, if the UE 110 knows that there will be keep-alive messages that will be transmitted to the eNodeB 102 at some periodicity, then the UE 110 can decide that the inactivity timer for going into RRC_Idle mode should be set to a time period greater than the periodicity of the keep-alive messages, or that the idle mode duty cycle should be selected so as to avoid interruption by the next keep-alive message during the "off" portion of the idle mode duty cycle (which requires excess signaling overhead in order to establish network re-entry).

Delay tolerance of application data transmission and/or reception—Different applications or different data types associated with a given application have different time sensitivity (or delay tolerance) for sending or receiving. For example, data associated with checking for software updates may be delay tolerant while data associated with sending a text message may not be delay tolerant. Delay tolerance can also be identified based on the type of device of UE 110. M2M devices typically perform specific functions that do not require a user to interact with the device and only require a network connection for specific functions. A Smart Park meter is an example of a M2M device. This is in contrast to devices, such as smart phones, that are used by actual users and run multiple applications, each of the applications potentially having different quality of service requirements over the network. Another example of a M2M type of device may be an Internet-enabled refrigerator that is configured to access the network every Sunday morning at 1 AM to check for firmware updates or to access the network if/when a fault flag is switched on. In one embodiment the UE 110 is aware that it is a M2M type of device and its application requirements. In another embodiment the type of device and application requirements associated with the UE 110 are specified in another machine, such as the HSS/HLR 302, and may be obtained by the UE 110 (in block 401). The UE 110 can use the delay tolerance and/or M2M device type information to, for example, determine whether to initiate DRX operation, select an appropriate DRX duty cycle, and/or further extend the current DRX duty cycle, to save power if the performance of the application is not affected by delayed data transmission/reception.

The presence of the application-radio cross layer 31 allows the application(s) to communicate certain types of information which were previously unavailable to the RRC/MAC layer 314. At a block 404, the application-radio cross layer 312 translates, processes, or otherwise uses the application information from the application layer 310 to generate (or finalize) inactivity trigger event information into a format useable by the RRC/MAC layer 314. For example, the application layer 310 can send an end-of-session data packet associated with an application which can be configured by the application-radio cross layer 312 for use by the RRC/MAC layer 314. The application-radio cross layer 312 comprises an application programming interface (API) and the implementation of the API functions.

The application-aware DRX trigger component 318 of the RRC/MAC layer 314 (also referred to as a radio layer) analyzes the inactivity trigger event information provided by the application layer 310 via the application-radio cross layer 312, information about all the applications running on the UE 110, network traffic information, the device characteristics information (e.g., delay tolerance and/or M2M device designation) from the NAS parameters component 322, and other relevant information to determine whether to trigger a DRX operation at a block 406. If a determination is made not to trigger DRX operation (no branch of block 406), then the application-aware DRX trigger component 318 waits for the next set of information from the application layer 310. Otherwise a determination is made to trigger DRX operation by the UE 110 (yes branch of block 406).

In the current technical specification, there is no application-radio cross layer 312. Data from the application layer is received by the RRC/MAC layer, but is not analyzed by the RRC/MAC layer. The RRC/MAC layer does not know the content of the received data packets, and merely readies the data packets for transmission to an eNodeB. In contrast, embodiments of the present disclosure include use of the energy-aware event monitor component 316 of the application layer 310, the application-radio cross layer 312, the application-aware DRX trigger component 318 of the RRC/MAC layer 314, and the NAS parameters component 322 of the NAS layer 320 for the UE 110 to negotiate DRX parameters for itself.

The application-aware DRX trigger 318 can also determine which DRX duty cycle to trigger based on the inactivity trigger event information (block 408). For example, if the UE 110 comprises a M2M type of device, a long DRX duty cycle may be appropriate. As another example, the DRX duty cycle may be selected to avoid interruptions during the "off" portion of the duty cycle by a keep-alive message. Alternatively, the UE 110 may not have the option to select a DRX duty cycle (if this is reserved for the eNodeB 102), in which case block 408 is optional.

Next at a block 410, the UE 110 signals to the eNodeB 102 an intent to trigger DRX operation and optionally, a particular DRX duty cycle, other DRX parameters, and other possible information relating to DRX operation such as application characteristics (collectively referred to as DRX parameters or the DRX related parameters). The signaling may comprise a handshake, request, confirmation, notification, or synchronization procedure with the eNodeB 102 prior to actually going into DRX mode.

In response to the intent signaled by the UE 110, the eNodeB 102 can confirm, modify, or reject all or a portion of the DRX intent suggested by the UE 110 at a block 412. The eNodeB 102 can specify one or more DRX parameters different from that recommended by the UE 110 at the block 410. In any case, the UE 110 receives a reply/command from the eNodeB 102 regarding going into DRX mode at a block 412. The UE 110, in turn, communicates a confirmation to the eNodeB 102 that the eNodeB's reply/command has been received at a block 413. Lastly, at a block 414, the UE 110 switches to DRX operation mode in accordance with the DRX parameters finalized by the eNodeB 102.

In one embodiment of blocks 410, 412, and 413, new radio resource control (RRC) signaling is used for the UE 110 to negotiate DRX parameters for itself with the eNodeB 102. As shown in FIG. 5, the new RRC signaling comprises RRCConnectionParametersRequest, RRCConnectionParametersResponse, and RRCConnectionParametersComplete messages. The new RRC signaling information is included in one or more radio frames. The UE 110 generates and transmits an RRCConnectionParametersRequest message to the eNodeB 102 to signal its intent to initiate DRX operation (communication 502). The RRCConnectionParametersRequest message includes information elements (IEs) corresponding to DRX related parameters (as decided by the UE 110 in accordance with its end-of-session, periodicity of keep-alive messages, delay tolerance, and/or type of M2M device information) and provisions for other values/settings/parameters that the UE 110 may suggest to the eNodeB 102. As an example, the RRCConnectionParametersRequest message can include the DRXConfig parameters which are defined as DRX-Config IE in 3GPP TS 36.331 Version 10.0.0, E-UTRA Radio Resource Control (RRC): Protocol Specification (Release 10), January 2011, including variations and evolutions thereof.

In response, the eNodeB 102 transmits an RRCConnectionParametersResponse message to the UE 110, which comprises a confirmation, modification, or rejection of the DRX related parameters suggested by the UE 110 (communication 504). The RRCConnectionParametersResponse message also comprises the DRX related parameters specified by the eNodeB 102, which may or may not be the same as one or more of the DRX related parameters suggested by the UE 110 in communication 502 in accordance with the confirmation, modification, or rejection decision by the eNodeB 102. The DRX related parameters included in the RRCConnectionParametersResponse message can be defined, for example, as the DRX-Config IE set forth in 3GPP TS 36.331 Version 10.0.0, E-UTRA Radio Resource Control (RRC): Protocol Specification (Release 10), January 2011, including variations and evolutions thereof. In some embodiments, the DRX related parameters included in the RRCConnectionParametersResponse message may comprise just the parameter(s) that are different from those suggested by the UE 110 since the UE 110 is already in possession of the remaining parameters.

Last, the UE 110 returns a RRCConnectionParametersComplete message to the eNodeB 102 confirming successful receipt of the RRCConnectionParametersResponse message, including the DRX related parameters set forth by the eNodeB 102 (communication 506). When there is a difference in the DRX related parameters between those suggested by the UE 110 and the response by the eNodeB 102, the DRX related parameters set forth by the eNodeB 102 in the RRCConnectionParametersResponse message controls.

In an alternative embodiment of blocks 410, 412, and 413, the existing RRC signaling mechanism for reestablishing connection with the network is extended to provide the UE-suggested DRX related parameters to the eNodeB 102. Reestablishment of network connection is initiated by the UE 110 when some kind of network connection failure occurs such as during handover or if there is an emergency. The re-establishment procedure is initiated by the UE 110 generating and transmitting to the eNodeB 102 a RRCConnectionReestablishmentRequest message via radio frame(s) that includes a re-establishment connection request (as is conventionally done) and also at least the DRX related parameters (e.g., DRX-Config IE) that are self-determined by the UE 110. The rest of the re-establishment procedure involves re-establishing all of the RRC connections as described in 3GPP TS 36.331 Version 10.0.0, E-UTRA Radio Resource Control (RRC): Protocol Specification (Release 10), January 2011, including variations and evolutions thereof. Similar to the embodiment above, if there is a difference in the DRX related parameters between the UE 110 and eNodeB 102 after the UE-suggested DRX related parameters are provided to the eNodeB 102, those from eNodeB 102 controls.

Flow diagram 400 can be repeated for each UE 110 associated with the eNodeB 102, in order for each of the UEs 110 to self-determine and recommend when to go into idle mode or DRX operation instead of the eNodeB 102. In some embodiments, the flow diagram 400 can be implemented for the UE 110 to suggest one or more changes in its DRX parameters based on its applications and/or device characteristics.

Accordingly, a new DRX triggering mechanism is described herein that takes advantage of the real-time application information of the UE 110 itself to self-determine optimal triggering of DRX operation, rather than having the eNodeB 102 statically assign an inactivity timer to the UE 110 to trigger DRX mode as is currently done. The UE 110 possesses more and better information about its network traffic needs than the eNodeB 102. Applications running on the UE 110 have certain characteristics or events—such as an application end-of-session, application keep-alive messages, and/or delay tolerance of application data—which are monitored by the energy-aware event monitor component 316 included in the application layer 310. Such application information, in turn, are processed or translated by the application-radio cross layer 312 into a form accessible by the application-aware DRX trigger component 318 of the RRC/MAC layer 314. A NAS parameters component 322 of the NAS layer 320 also provides device characteristic information—such as device data delay tolerance and/or M2M device type information—to the application-aware DRX trigger component 318. The application-aware DRX trigger component 318 analyzes the application information and/or the device characteristic information to determine whether to initiate DRX operation and optionally, which DRX duty cycle or other DRX parameters to implement. The UE 110 sends a request to the eNodeB 102 seeking approval or confirmation to trigger DRX operation (and optionally a particular DRX duty cycle). When the eNodeB 102 responds (e.g., agreement, modification, or rejection of the DRX parameters suggested by the UE 110), UE 110 starts DRX operation in accordance with the response by the eNodeB 102.

The term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor, or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the spirit and scope of the invention.

The Abstract of the Disclosure is provided to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than features of a single disclosed embodiment. Thus the following claims are hereby incorporated into the Detailed Description, with each claim standing on its own as a separate embodiment.

What is claimed is:

1. An apparatus of a user equipment (UE) comprising: transceiver circuitry; and
processing circuitry, the processing circuitry to configure the transceiver circuitry to:
transmit a radio-resource control (RRC) request message with an extended idle mode discontinuous reception (DRX) information element (IE), the extended idle mode DRX IE to include one or more proposed parameters for extended idle mode DRX; and
decode an RRC accept message; and
wherein the processing circuitry is configured to:
apply, in response to receipt of the RRC accept message:
one or more different parameters for extended idle mode DRX, when an extended idle mode DRX IE is included in the RRC accept message that includes the one or more different parameters, the one or more different parameters being different from the one or more proposed parameters;
the proposed parameters for extended idle mode DRX when an extended idle mode DRX IE is included in the RRC accept message that does not include one or more different parameters for the proposed parameters; and
non-extended idle mode DRX parameters for regular DRX when the RRC accept message does not include an extended idle mode DRX IE, and
configure the transceiver circuitry to monitor a control channel discontinuously, based on the applied parameters.

2. The apparatus of claim 1 wherein the RRC request message comprises an attach request.

3. The apparatus of claim 2 wherein the RRC accept message is received in response to the RRC request message.

4. The apparatus of claim 2 wherein the processing circuitry is further configured to:
determine whether communications associated with applications of the UE are delay tolerant;
generate the RRC request with the extended idle mode DRX IE when communications associated with applications of the UE are delay tolerant.

5. The apparatus of claim 4, wherein the processing circuitry is further configured to:
select a duty cycle for extended idle mode DRX based on a delay tolerance of the applications; and include a parameter for the selected duty cycle in the extended idle mode DRX IE of the RRC request.

6. The apparatus of claim 5 wherein the processing circuitry is further configured to
refrain from generating the RRC request with the extended idle mode DRX IE when communications associated with applications of the UE are not delay tolerant.

7. The apparatus of claim 1 wherein in response to receipt of the RRC accept message that includes the extended idle mode DRX IE, the processing circuitry is to configure the UE to:
enable extended idle mode DRX including setting an inactivity tinier for based on an extended idle mode DRX length.

8. The apparatus of claim 1 wherein in response to receipt of the RRC accept message that does not include the extended idle mode DRX IE, the processing circuitry is to configure the UE to:
enable regular DRX based on broadcasted parameters.

9. The apparatus of claim 1 wherein, when operating in extended idle mode DRX, the processing circuitry is configured to activate the transceiver circuitry to monitor the control channel for a paging message during an active time of a DRX cycle.

10. The apparatus of claim 1 wherein the UE is further configured to operate in RRC idle mode during extended idle mode DRX.

11. The apparatus of claim 1 wherein the UE is configured to provide non-access stratum (NAS) parameters as part of RRC connection reconfiguration indicating that UE terminated communications associated with the HE are delay tolerant.

12. The apparatus of claim 11 wherein the NAS parameter indicate that the UE is a machine-type device.

13. The apparatus of claim 11 wherein the NAS parameters indicate that the UE is a sensor device.

14. The apparatus of claim 1 wherein the proposed parameters for extended idle mode DRX include a proposed DRX cycle length that is longer than a DRX cycle length received in system information.

15. The apparatus of claim 1 wherein in response to receipt of the RRC accept message that includes the extended idle mode DRX IE, the processing circuitry is to configure the UE to:
enable extended idle mode DRX including setting an inactivity timer for RRC idle mode for a time greater than a periodicity of keep alive messages.

16. A non-transitory computer-readable storage medium that stores instructions for execution by one or more processors of a user equipment (UE) to configure the UE to perform operations to:
transmit a radio-resource control (RRC) request message with an extended idle mode discontinuous reception (DRX) information element (IE) when communications associated with applications of the UE are delay tolerant, the extended idle mode DRX IE to include one or more proposed parameters for extended idle mode DRX; and
decode an RRC accept message; and
apply, in response to receipt of the RRC accept message:
one or more different parameters for extended idle mode DRX, when an extended idle mode DRX IE is included in the RRC accept message that includes the one or more different parameters, the one or more different parameters being different from the one or more proposed parameters;

the proposed parameter for extended idle mode DRX when an extended idle mode DRX IE is included in the RRC accept message that does not include one or more different parameters for the proposed parameters; and
non-extended idle mode DRX parameters for regular DRX when the RRC accept message does not include an extended idle mode DRX IE, and
monitor a control channel discontinuously, based on the applied parameters.

17. The non-transitory computer-readable storage medium of claim 16, wherein the one or more processors are further configured to:
determine whether communications associated with applications of the UE are delay tolerant;
generate the RRC request with the extended idle mode DRX IE when communications associated with applications of the UE are delay tolerant.

18. The non-transitory computer-readable storage medium of claim 17,
wherein the RRC request message comprises an attach request; and
wherein the RRC accept message is received in response to the RRC request message.

19. An apparatus of user equipment (UE) comprising:
processing circuitry; and memory,
wherein the processing circuitry is configured to:
generate a radio-resource control (RRC) request message with an extended idle mode discontinuous reception (DRX) information element (IE) when communications associated with applications of the UE are delay tolerant, the extended idle mode DRX IE to include one or more proposed parameters for extended idle mode DRX; and
decode an RRC accept message; and
wherein in response to receipt of the RRC accept message, the processing circuitry is configured to:
apply parameters included in an extended idle mode DRX IE of the RRC accept message when an extended idle mode DRX IE is included in the RRC accept message; and
non-extended idle mode DRX parameters for regular DRX when the RRC accept message does not include an extended idle mode DRX IE.

20. The apparatus of claim 19 wherein the parameters included in the extended idle mode DRX IE of the RRC accept message comprise either the proposed parameters or parameters that are different than the proposed parameters.

21. The apparatus of claim 20 wherein the UE is a machine-type UE configured to operate without user interaction.

22. The apparatus of claim 20 wherein the processing circuitry is further configured to determine whether communications associated with applications of the UE are delay tolerant:
generate the RRC request message with an extended idle mode DRX IE, to initiate DRX operation, when all communications associated with applications of the UE are delay tolerant; and
refrain from generating the RRC request message with the extended idle mode DRX IE when communications associated with applications of the UE are not delay tolerant.

23. The apparatus of claim 20 wherein the processing circuitry is further configured to determine parameters to propose for extended idle mode DRX IE based on delay tolerance of communications for applications operating on the UE.

24. The apparatus of claim 20 wherein the processing circuitry is further configured to monitor a control channel discontinuously, based on the applied parameters.

\* \* \* \* \*

UNITED STATES PATENT AND TRADEMARK OFFICE
CERTIFICATE OF CORRECTION

PATENT NO. : 9,538,547 B2
APPLICATION NO. : 15/062572
DATED : January 3, 2017
INVENTOR(S) : Gupta et al.

It is certified that error appears in the above-identified patent and that said Letters Patent is hereby corrected as shown below:

In the Claims

In Column 11, Line 14, in Claim 7, delete "tinier" and insert --timer--, therefor In Column 11, Line 32, in Claim 11, delete "HE" and insert --UE--, therefor Signed and Sealed this
Twenty-seventh Day of March, 2018

Andrei Iancu
*Director of the United States Patent and Trademark Office*